United States Patent Office 3,346,667
Patented Oct. 10, 1967

3,346,667
PRODUCT PRODUCED BY REACTING PHOSPHO-
RUS OXIDE OR SULFIDE, AN OXIRANE COM-
POUND, AND A HYDROXY OR THIOL COM-
POUND TOGETHER, AND PROCESS
Francis G. Firth, 11580 Bellagio Road,
Los Angeles, Calif. 90049
No Drawing. Filed Sept. 6, 1963, Ser. No. 307,020
10 Claims. (Cl. 260—920)

This invention relates to a new and improved phosphorus-containing composition and method of preparing it.

The use of various phosphorus-containing compositions is widespread and their utility is as diverse as the nature of the phosphorus-containing products available. However, despite wide areas of utility, there has been a continuing need and interest, particularly in the field of syntheitc plastics, although also in many other applications as hereinafter discussed, for phosphorus-containing materials embodying hydroxyl or similar reactive terminations having low acid numbers, i.e., 1.0 or less, as well as satisfactory methods of preparing such compounds.

In general, most commercially available phosphorus compounds heretofore used in applications such as plasticizers, flame retardant additives for polymers, lubricating oil additives, corrosion inhibitors, detergents, hydraulic fluids, and the like, have been either neutral phosphoric acid esters, such as organic phosphates of the type exemplified by tributyl phosphate and tricresyl phosphate, or more complex compounds such as trisbetachlorethyl phosphate. For example, various neutral and acid esters of ortho and pyrophosphoric acid, e.g., ortho phosphoric acids of the structure:

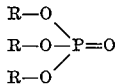

have been long known and are now commercially available. However, esters of these types are generally non-acidic and can be considered as chemically non-functional because no chemically reactive groups are provided, such as by hydroxyl termination and none are available for further chemical reaction.

Other prior forms of phosphorus-containing materials include alkyl acid phosphates which usually are mixtures of partially-esterified phosphoric acids containing small amounts of monohydric alcohols as well as free metaphosphoric acid and pyrophosphoric acid. For example, commercial n-butyl acid phosphate generally contains about 39 percent of phosphorus and has an acid number (expressed as milligrams of potassium hydroxide per gram of product) of 450. A commercial grade of dibutylpyrophosphate, exemplifying a complex mixture of various ortho, pyro and partially esterfied phosphates, typically has a phosphorus content of about 22 percent and an acid number of approximately 400. It is to be noted that such acid phosphates, when considered chemically reactive at all, are found to have reactivity primarily due to their acidity and are used in applications where this feature is significant.

Because of the ability to impart flame retardancy to compositions containing them, and other advantageous properties of phosphorus compounds, it is highly desirable to provide, and there has been a continuing need for, relatively low cost polyfunctional phosphorus-containing materials embodying different chemical substituents such as alkyl, aromatic, alicyclic, and the like.

In addition, a significant problem heretofore encountered in the use of prior phosphorus-containing compositions in diverse applications has been a susceptibility to hydrolysis with subsequent loss of effectiveness. On standing in humid environments, for example, polyurethane made using a hydrolysis-prone phosphorous containing polyol of the prior art, e.g. one made with phosphoric acid rather than $P_2O_5$ will adsorb moisture and disintegrate with consequent loss of strength, buoyancy and usefulness.

Accordingly, a principal object of this invention is to provide new and improved phosphorus-containing compositions, and a method for economically preparing such useful materials.

A further object of the invention is to provide new and improved phosphorus-containing reaction products having a high hydroxyl equivalence, an acid number less than 1.0 and a high concentration of chemically combined phosphorus.

A still further object of the invention is the preparation of novel chemical products highly resistant to hydrolytic attack, containing a high percentage of phosphorus, a high hydroxy equivalence and a low acid number.

These and other objects and advantages of the invention will appear more fully from the following description thereof.

In general, this invention comprises the composition obtained by the reaction of, especially the simultaneous reaction of, (1) phosphorus oxide or phosphorus sulfide, preferably phosphorus pentoxide, with (2) an oxyalkylating agent and (3) a compound embodying at least one hydroxyl group or other source of an active hydrogen atom, e.g., thiol group.

The term "phosphorus oxide," as used in the specification and claims, is intended to include as the phosphorus pentoxide both $P_2O_5$ and $P_4O_{10}$; thus, $P_2O_5$, and $P_4O_{10}$ of the following structure are included:

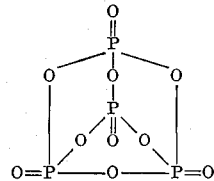

Further, $P_2O_5$ in the form described and claimed in U.S. Patent No. 3,077,382, Klein et al., also can be used. In addition, the term "phosphorus oxide" also is intended to include phosphorus trioxide ($P_4O_6$) and phosphorus tetroxide ($P_2O_4$). Similarly, the term "phosphorus sulfide," as used in the specification and claims, is intended to include the pentasulfide ($P_2S_5$), the trisulfide ($P_4S_6$), the sesquisulfide ($P_4S_3$), and the heptasulfide ($P_4S_7$). At present, phosphorus pentoxide and phosphorus pentasulfide are more readily available and are preferred. Phosphorus pentoxide is an especially preferred oxide and for that reason particular reference thereto is made throughout the specification.

The expression "oxyalkylating agent," as used in the specification and claims, is intended to refer to a compound containing at least one reactive oxirane ring, i.e.,

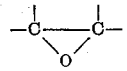

Illustrative examples of suitable oxyalkylating agents are styrene oxide, benzylethylene oxide, phenyl glycidyl ether, and allyl glycidyl ether. In addition, the term "oxyalkylating agent" also is intended to include compounds such as epichlorohydrin, glycerol monoglycidyl ether, glycerol diglycidyl ether, glycerol triglycidyl ether, 1-heptylene oxide, alkylene oxides, such as ethylene oxide, propylene oxide, butylene oxide, diisobutylene oxide, glycidyl acrylate, vinyl cyclohexene dioxide, and the like.

Illustrative of suitable compounds containing an active hydrogen atom, especially a hydrogen atom from an attached hydroxyl or thiol group, are hydroxyl-containing compounds, including monoalcohols or alkanols, such as ethyl alcohol, butyl alcohol, allyl alcohol, n-butyl alcohol, isobutyl alcohol, sec. butanol, tertiary butanol, hexyl alcohol, cyclohexanol, capryl alcohol, cetyl alcohol, stearyl alcohol, benzyl alcohol, as well as corresponding alkenols, cycloalkanols, and the like; illustrative polyalcohols are glycerol, trimethylolpropane, propylene glycol, ethylene glycol, 1,4-butanediol, 1,3-butylene glycol, triethylene glycol, hexamethylene glycol, pentaerythritol, arabitol, mannitol, monosaccharides, polysaccharides, inositol, sorbitol, sucrose, methyl glucoside, polyoxyalkylene glycols, hydroxyl-bearing polyesters, polyvinyl alcohols, cyclohexane diols, cyclopentane diols, natural, synthetic and modified hydroxyl-bearing oils, cottonseed oil, corn oil, lard oil, soybean oil, castor oil, rapeseed oil, linseed oil and peanut oil; suitable mono and polyhydric aminoalcohols are primary, secondary and tertiary, dimethylaminoethanol, triethanolamine, diethylaminopropylamine, n-hydroxyethylpentamethylene diamine, tris(hydroxyethyl)triethylenetetramine, polytetramethylene glycols, polyalkyleneether thioglycols and thiols generally, specifically including thiols corresponding to the foregoing. Other illustrative compounds also include mono or polynuclear phenols with hydroxyl or thiol groups present such as phenol, catechol, resorcinol, hydroquinone, pyrogallol, phloroglucinol, cresols, xylenols, naphthols, halogen-substituted phenols, aminophenols, phenanthrol, alkylated derivatives of aromatic phenols such as hexylresorcinol, tertiary-butylcatechol, polyphenols and substituted polyphenols, p,p'-methylenebisphenol, 2,2-bis(4-hydroxyphenyl)propane, 2,2-bis(2-chloro-4-hydroxylphenyl)propane, 1,2,2,3 - tetrakis(hydroxyphenyl)propane, 2,2' - dihydroxybenzophenone; bis-(4 - hydroxylphenyl) sulfone, hydroxynaphthalenes and anthracenes. Also suitable are aromatic novalacs such as phenol formaldehyde novalacs, Mannich bases as made by the Mannich reaction described in "Organic Reactions," vol. 1, pages 304 et seq., 2:6-(dimethylaminomethyl)phenol, 2-(dimethylaminomethyl)-4-octylphenol, and 4,4'-dihydroxy-3:5:3': 5' - tetra - (dimethylamine-methyl)-diphenyl - dimethylmethane, also can be used.

Specifically preferred hydroxyl compounds are oxyalkylated, e.g., oxypropylated, polyhydroxy compounds of the foregoing types such as oxypropylated sorbitol, trimethylolpropane, glycerol, pentaerythritol, sucrose, and a-methyl glucoside.

In carrying out the practice of the present invention, and for purposes of modifying the rate of reaction, for convenience it sometimes is desirable, but is not essential, that the phosphorus pentoxide or phosphorus pentasulfide initially be formed into a slurry using a nonreactive liquid medium or solvent such as a chlorinated hydrocarbon, hydrocarbons generally, or the like. For each or removal after the reaction is complete, a liquid medium having a relatively low boiling point is often desired, typically one not greater than about 100° C. Oxygen-containing solvents generally are to be avoided because of the possible mixture with phosphorus pentoxide. Illustrative of suitable liquid media or organic solvents are 1,2-dichloroethane, ethylene dichloride, carbon tetrachloride, chloroform, tetrachloroethylene, methylene chloride, hexane, 1, 3-propylene dichloride and cyclohexane. Chloroform is preferred. The use of a liquid reaction medium or solvent of the foregoing type generally is not critical and may be dispensed with, provided suitable means are provided to insure that the finely-divided phosphorus pentoxide or phosphorus pentasulfide is substantially wetted simultaneously by the other reactants.

In carrying out the reaction of this invention, a well-agitated, closed vessel equipped with sufficient cooling and heating means, reflux condenser, thermometers or their equivalents, and provision for operating under elevated pressure or vacuum are desired. In most instances, the oxyalkylating agent and hydroxyl-containing compound (or other compound containing an active hydrogen atom) are generally charged into the reaction vessel first, in a manner such that substantially no reaction occurs in the absence of externally-applied heat, and with agitation of the contents of the reaction vessel the phosphorus oxide, phosphorus sulfide, or mixture thereof, is added thereto slowly either as a dry powder, or, preferably, in the form of a fine suspension or slurry in an inert liquid medium, such as one of the chlorinated hydrocarbons previously disclosed, in order to effect the desired simultaneous reaction.

When oxyalkylating agents which are gases at room temperature are used, the reaction system can be pressurized to maintain a liquid phase in the reaction vessel and the phosphorus pentoxide or phosphorus pentasulfide introduced under pressure, e.g., as a slurry. On the other hand, if the oxyalkylating agent is normally a liquid at room temperature, the phosphorus pentoxide or phosphorus pentasulfide may be introduced simply by sifting it slowly into the agitated reaction mixture, with due precautions against the phosphorus pentoxide or phosphorus pentasulfide absorbing moisture from the atmosphere.

In any event, the resulting simultaneous reaction is exothermic and fast; in some instances, the energy released has been measured to be in excess of 1200 B.t.u.'s per pound of phosphorus pentoxide used, while a much slower reaction occurs using phosphorus pentasulfide; on the other hand, in some instances externally applied heat is required to complete the reaction. In some instances, a low initial temperature, e.g., −40° C. to 0° C. is desirable to prevent premature reaction. On the other hand, at times, temperatures as high as 120° C. can be used. In most cases, since an exothermic reaction is involved, temperature criticality is related to the specific ingredients being used.

Temperature control either by the rate of addition and/or by efficient cooling is critical in order to prevent or control polymerization and preclude charring of the reaction mass or development of a dark and undesirable color or an extremely high viscosity. In large scale manufacture, the practice of this invention envisions advantageous operation in a continuously scraped, or pipe line type, reactor whereby process heat control is relatively efficient.

While the proportions of the reactants can be varied somewhat in accordance with this invention without departing from the spirit thereof, a more specific embodiment of the invention comprises the simultaneous reaction product of the following ingredients added in the indicated molar ranges:

(1) $P_2O_5$ or $P_2S_5$ (preferably $P_2O_5$)—1 mole.
(2) Oxyalkylating agent (preferably alkylene oxide)— 3.5 to 20 (preferably at least 4 moles).
(3) Hydroxyl-containing compound—Up to 2 moles.

In general, while the reactants of the herein-indicated types can be varied both in proportions and as to the specific compounds employed, in a preferred practice of the invention, there are combined in a simultaneous chemical reaction an alkylene oxide, such as propylene oxide, a polyhydroxyl compound, such as sorbitol, sucrose and/or trimethylol propane or an oxypropylated polyol, preferably oxypropylated sorbital, and phosphorus pentoxide. Typically, the amount of oxyalkylating agent (propylene oxide) consumed is at least 4 moles for each mole of $P_2O_5$, the exact amount depending on the specific hydroxyl compound employed and the amount of solvent, if any, employed. Even more specifically, a preferred embodiment of this invention comprises the simultaneous reaction of about 3.5 to 20 moles of propylene oxide, one mole of $P_2O_5$, and 2 moles of sorbitol, sucrose or trimethylol propane or oxypropylated sorbital.

In the specification and claims, the expression "simultaneous reaction" is intended to refer to the chemical reaction occurring when at least three of the herein-described different types of reactants (1), (2) and (3) are chemically combined under suitable reactive conditions and is intended to exclude chemical reaction of two of the three ingredients, or less than all of the ingredients, followed by subsequent addition and reaction of another reactant of the type indicated. Thus, for example, the reaction of propylene oxide with $P_2O_5$ to form a separate reaction product or adduct with subsequent addition and reaction of a hydroxy compound is not a "simultaneous reaction" in the present invention.

The following examples are offered in order that those skilled in the art may achieve a fuller understanding of the invention and the preferred methods by which the same may be carried into effect. It should be understood, however, that modifications thereof may be made which are within the full intended scope of the invention as defined in the appended claims.

EXAMPLE 1

A slurry of 142 grams of phosphorus pentoxide in 500 grams of methylene chloride is placed into a three-necked flask provided with stirrer, thermometer, addition funnel and a Dry Ice-acetone cooling bath. A solution of 148 grams of n-butanol in 870 grams of propylene oxide is added slowly under cooling conditions so that the temperature of the flask was held below 0° C. A highly exothermic reaction is observed upon each addition. After the propylene oxide solution has been added, the volatiles are distilled off and the product is stripped under 2 mm. of vacuum at 110° C.

*Results*

| | | |
|---|---|---|
| Yield | grams__ | 537 |
| Viscosity, 68° F. | centipoises__ | 250 |
| Color | | Water white |
| Phosphorus content | percent__ | 11.6 |
| Hydroxyl equivalence | | 265 |
| Acid number | | 0.75 |
| Molar ratio of reactants: | | |
| n-Butanol | moles__ | 2 |
| $P_2O_5$ | do____ | 1 |
| Propylene oxide | do____ | 4 |

Gas chromatographic analysis of the distillate shows only traces of n-butanol, indicating that all the butanol has reacted. Infrared spectroscopy of the product shows I.R. bands (3410 cm.$^{-1}$) indicating the presence of OH groups.

EXAMPLE 2

288 grams of 1,2-butylene oxide and 74 grams of n-butanol are placed in a three-necked flask equipped with stirrer, thermometer, adidtion funnel, and means for cooling and heating. A slurry is made of 71 grams of phosphorus pentoxide in 300 grams of chloroform, which slurry is gradually added to the flask with good cooling. A rapid temperature rise, which subsides rapidly, is observed during each addition. After all of the slurry has been added, the temperature is allowed to rise to 35° C. and is held there for 30 minutes. The volatiles are then distilled off and the product subjected to a vacuum strip at 110° C.

*Results*

| | | |
|---|---|---|
| Yield | grams__ | 290 |
| Viscosity, 68° F. | centipoises__ | 130 |
| Color | | Water white |
| Phosphorus content | percent__ | 10 |
| OH equivalent | | 280 |
| Acid number | | 0.5 |

Again, presence of OH is indicated by I.R. band at 3410 cm.$^{-1}$ and the existence of a P=O grouping is evidenced by an I.R. band at 1280 cm.$^{-1}$.

EXAMPLE 3

To a one-liter flask equipped with stirrer, thermometer, additional funnel and heating and cooling means, is introduced a solution of 74 grams of n-butanol in 371 grams of epichlorohydrin. The temperature is dropped to —40° C. with a Dry Ice-acetone bath, and 71 grams of phosphorus pentoxide, which is protected from the atmosphere, is gradually sifted into the stirred contents of the flask. The temperature is not permitted to increase above —10° C. during the period of addition, after which the temperature is allowed to rise to 37° C. and is held there for 10 minutes. The volatiles in the liquid in the flask are then distilled off at 120° C., and then a vacuum of 2 mm. Hg is applied at 100° C. for 30 minutes, and the contents allowed to cool.

By analyses of the distillate and weighing the contents of the flask, it is estimated that the contents have reacted in the ratio of butanol—1 mole, epichlorohydrin—4 moles, and phosphorus pentoxide—1 mole.

*Results*

| | | |
|---|---|---|
| Yield | grams__ | 320 |
| Viscosity, 68° F. | centipoises__ | 1640 |
| Color | | Water white |
| Phosphorus content | percent__ | 9.15 |
| Chlorine content | do____ | 20.0 |
| OH equivalent | | 325 |
| Acid number | | 0.75 |

I.R. bands at 3375 cm.$^{-1}$, 1265 cm.$^{-1}$, and 1025 cm.$^{-1}$ indicate that OH groups are present and that the chlorine has remained attached to a carbon atom and is available as functional termination.

EXAMPLE 4

Into a reaction vessel equipped with agitation means, and coils for heating and cooling, are placed 2-gram moles of phosphorus pentoxide in 500 grams of hexane. The temperature in the vessel is reduced to —20° C. and held there during the subsequent addition. A solution of 4-gram moles of n-butanol in 12-gram moles of allyl glycidyl ether is then introduced in a thin stream over a period of one hour, and the temperature allowed to rise to 40° C. and is maintained at this temperature for 30 minutes. Heating is then applied and the distillate is collected. Analysis shows that all the hexane and 4-gram moles of allyl glycidyl ether distill over, which indicates that the reaction product is produced by the reaction of 1 mole of phosphorus pentoxide, 2 moles of n-butanol, and 4 moles of allyl glycidyl ether.

*Results*

| | | |
|---|---|---|
| Yield | percent__ | 97 |
| Viscosity, 68° F. | centipoises__ | 150 |
| Color | | Water white |
| OH equivalent | | 378 |
| Acid number | | 1.0 |
| Phosphorus content | percent__ | 8.2 |

The existence of I.R. bands at 3420 cm.$^{-1}$ indicates that OH groups are present. Absence of the band at 3025 cm.$^{-1}$ shows that the oxirane group has been reacted. The terminal allyl groups are shown to be present by the existence of the bands at 3080 cm.$^{-1}$ and at 1645 cm.$^{-1}$.

EXAMPLE 5

A pressure reaction vessel fitted for agitation, fed with a pressure injection pump, and capable of being heated and cooled, is charged with 71 grams of phosphorus pentoxide and 300 grams of chloroform. A container of ethylene oxide is reduced in temperature to 0° C. and 176 grams of ethylene oxide is added to and mixed with 74 grams of n-butanol, also chilled to 0° C.

The pressure vessel and contents are cooled to 0° C. and the chilled mixture of butanol and ethylene oxide is introduced over a period of one hour, after which the vessel is sealed and the temperature allowed to rise. At a temperature of 70° C., the pressure gage registers 85 p.s.i. and no further drop or rise in pressure is observed at that temperature. The pressure in the vessel is released and the contents heated to 100° C. to remove the volatiles. The results indicate that the ratio of reactants is phosphorus pentoxide—1 mole, n-butanol—2 moles, and ethylene oxide—4 moles.

*Results*

| | |
|---|---|
| Yield _____grams__ | 220 |
| Viscosity, 68° F. _____centipoises__ | 310 |
| Color _____ Light yellow | |
| Phosphorus content _____percent__ | 13 |
| OH equivalent _____ | 215 |
| Acid number _____ | 0.4 |

The existence of I.R. bands at 3400 cm.$^{-1}$, 1270 cm.$^{-1}$ and 1025 cm.$^{-1}$ indicates the presence of OH, P=O, and —P—O—C— groups.

EXAMPLE 6

Using the same equipment, conditions, and procedures as described in Example 1, except that sec. butanol is used, instead of n-butanol, a product is obtained which, upon analysis, indicates that a secondary alcohol will react under the given conditions in a similar manner to a primary alcohol.

*Results*

| | |
|---|---|
| Yield _____percent__ | 95 |
| Viscosity, 68° F. _____centipoises__ | 110 |
| Color _____ Water white | |
| Phosphorus content _____percent__ | 11 |
| Hydroxyl equivalence _____ | 272 |
| Acid number _____ | 0.5 |

I.R. data show bands at 3420 cm.$^{-1}$, 1280 cm.$^{-1}$, which indicate the presence of OH and P=O groups.

EXAMPLE 7

Using the same equipment and techniques as in Example 1, a reaction is run using tertiary butanol and excess propylene oxide. The progress of the reaction is normal and a product with the following properties is obtained.

*Results*

| | |
|---|---|
| Yield _____percent__ | 98 |
| Viscosity, 68° F. _____centipoises__ | 430 |
| Color _____ Water white | |
| Phosphorus content _____percent__ | 11.5 |
| OH equivalent _____ | 260 |
| Acid number _____ | 0.78 |
| Molar ratio of reactants: | |
|    Tertiary butanol _____moles__ | 2 |
|    P$_2$O$_5$ _____do____ | 1 |
|    Propylene oxide _____do____ | 4 |

I.R. bands at 3420 cm.$^{-1}$, 1280 cm.$^{-1}$ and 1010 cm.$^{-1}$ indicate the presence of OH, P=O, and —P—O—C— groups.

EXAMPLE 8

There are reacted 71 grams of phosphorus pentoxide, 90 grams of 1,3-butylene glycol and 232 grams of propylene oxide under the conditions established in Example 1.

*Results*

| | |
|---|---|
| Viscosity, 68° F. _____centipoises__ | 470 |
| Color _____ Water white | |
| Phosphorus content _____percent__ | 11 |
| Hydroxyl equivalence _____ | 140 |
| Acid number _____ | 0.65 |
| Molar ratio of reactants: | |
|    P$_2$O$_5$ _____moles__ | 1 |
|    1,3 butylene glycol _____do____ | 2 |
|    Propylene oxide _____do____ | 4 |

I.R. data show bands at 3400 cm.$^{-1}$, 1275 cm.$^{-1}$ and 1010 cm.$^{-1}$ which indicate the presence of OH, P=O, and —P—O—C— groups.

EXAMPLE 9

Part A

A one-liter flask is provided with stirrer, heating and cooling means, and an additional funnel. To the flask is added a slurry of 71 grams of phosphorus pentoxide in 300 grams of 1,1,2-trichloroethane. 134 grams of trimethylol propane, dissolved in 232 grams of propylene oxide, is added in a thin stream to the well-agitated phosphorus pentoxide slurry in the flask. The temperature of the reactants is maintained between 20° and 30° C. The reaction is highly exothermic, and after the addition of all of the reactants is completed, the temperature is raised to 45° C. and held at this temperature for 30 minutes. The product is then stripped free of volatiles and analyzed. The molar ratio of reactants is phosphorus pentoxide—1 mole, trimethylol propane—2 moles, and propylene oxide—4 moles.

*Results*

| | |
|---|---|
| Viscosity, 68° F. _____centipoises__ | 10,900 |
| Color _____ Pale yellow | |
| Phosphorus content _____percent__ | 9.45 |
| Hydroxyl equivalent _____ | 116 |
| Acid number _____ | 0.58 |

The existence of I.R. bands at 3380 cm.$^{-1}$, 1275 cm.$^{-1}$ and 1010 cm.$^{-1}$ indicate the presence of OH, P=O, and —P—O—C— groups.

Part B

The product of Part A is formulated into an isocyanate-terminated polymer by conventional means using the following proportions:

| | Parts |
|---|---|
| Phosphorus polyol of Part A _____ | 116 |
| p,p″-Diphenyl methane diisocyanate _____ | 194 |
| | 310 |

The diisocyanate is heated to a temperature of 150° F. under a nitrogen atmosphere in a conventional reaction flask equipped with heating, cooling and agitation; the warmed polyol is then run in as a through-stream over a period of one hour while the temperature in the flask is held at 165° F.

A final cook at 190° F. for one hour is followed by cooling to 140° F.; to the flask is then added a mixture of 0.5 part of methyl diethanolamine and 171 parts of expressed castor oil. The mixture is thoroughly blended and vacuum-degassed for 20 minutes and the contents of the flask then poured into trays coated with a separation agent. After an oven cure of 250° F. for 6 hours, the solidified material is stripped from the trays. It is found that the resultant polymer has excellent mechanical and electrical characteristics and is elastomeric in nature. After exposure to a flame, the polymer is shown to be self-extinguishing.

EXAMPLE 10

Part A

In the same equipment used for Example 1, and under identical conditions, a reaction product is made from 1 mole of phosphorus pentoxide, 2 moles of 2-octanol and 4 moles of propylene oxide. The reaction is exothermic and the product yield is quantative.

*Results*

| | |
|---|---|
| Viscosity, 68° F. _____centipoises__ | 400 |
| Color _____ Water white | |
| Phosphorus content _____percent__ | 12 |
| Hydroxy equivalent _____ | 320 |
| Acid number _____ | 1.0 |

The existence of I.R. bands at 3400 cm.$^{-1}$, 1280 cm.$^{-1}$, and 1010 cm.$^{-1}$ indicates the presence of OH, P=O, and —P—O—C— groups, respectively.

Part B

A series of tests are performed to determine the effect of additions of the product of Part A to automotive fuels. Lighter hydrocarbon fractions, such as gasoline blends, have a tendency to form gums and other deposits on storage, especially in the presence of catalytic materials such as copper. A noninhibited, mixed 100 octane gasoline is used as the base standard and different amounts of the phosphorus-containing product of Part A are added. The standard, and the gasoline containing the additive, are then tested similarly according to ASTM Test D–525. This test essentially consists of putting the sample in a test bomb, filling the bomb with oxygen at 100 p.s.i. and at 59° to 77° F. Heat is then applied at 210° F. and the end point is taken as the time when the pressure in the bomb drops. This is known as the break point and is given as a value in hours.

| Sample: | Break point (hrs.) |
|---|---|
| Gasoline (standard) | 2 |
| Gasoline plus 0.25% phosphorus compound | 12 |
| Gasoline plus 0.5% | 40 |

From this data it can be concluded that the phosphorus-containing composition of this invention is an effective oxidation inhibitor for oxidation in gasoline.

EXAMPLE 11

Part A

A reaction product is made under good temperature-controlled conditions by combination of 1 mole of phosphorus pentoxide, slurried with ethylene dichloride, 2 moles of cyclohexanol, and 8 moles of propylene oxide, any excess of which is stripped off later with the ethylene dichloride. Analysis of the distillate shows that 4 moles of propylene oxide react.

Results

| | |
|---|---|
| Viscosity, 68° F. centipoises | 400 |
| Color | Water white |
| Phosphorus content percent | 12 |
| OH equivalent | 235 |
| Acid number | 0.52 |

The existence of I.R. bands at 3426 cm.$^{-1}$, 1285 cm.$^{-1}$, and 1010 cm.$^{-1}$ indicates the presence of OH, P=O, and —P—O—C— groups.

Part B

A quantity of the product of Part A is used as a compatible wetting agent for an agricultural insecticide spray. An emulsifiable concentrate is prepared from the following:

| | Percent by weight |
|---|---|
| Parathion (diethyl - p - nitrophenyl monothio phosphate) | 19 |
| Xylene | 78 |
| Product of Part A | 3 |

This concentrate is stable upon storage and upon dilution in water with agitation, an emulsion suitable for agricultural application is formed. Excellent wetting of foliage is observed, which is not observed when commonly used surfactants of the alkyl sulfonate type or nonyl phenol polyether type are substituted for the phosphorus surfactant.

EXAMPLE 12

Part A

A reaction product is made by methods previously described, by reacting together 71 grams of phosphorus pentoxide in a methylene chloride slurry with a mixture of 58 grams of allyl alcohol and 232 grams of propylene oxide. The reaction is highly exothermic and by means of refrigeration the flask contents are maintained at a temperature between —20° and 0° C. After the addition of all reactants is completed, the product is heated to 40° C. for 30 minutes and the volatiles removed. Analysis of the distillate and the product show that the reactants combined in the proportions of phosphorus pentoxide—1 mole, allyl alcohol—2 moles, and propylene oxide—4 moles.

Results

| | |
|---|---|
| Viscosity 68° F. centipoises | 60 |
| Color | Water white |
| Phosphorus content percent | 12 |
| Hydroxyl equivalent | 248 |
| Acid number | 0.72 |

The existence of I.R. bands at 3425 cm.$^{-1}$, 1280 cm.$^{-1}$, and 1010 cm.$^{-1}$ indicates the presence of OH, P=O, and —P—O—C— groups.

Part B

Some of the product produced above is mixed with 0.5 percent by weight of cobalt naphthenate and 1 percent by weight of cumene peroxide, poured into a container, and placed in an oven held at 200° F. for 6 hours. The sample is then cooled and examined and is found to be a clear, water white, tough polymer that will neither burn nor melt, and has excellent mechanical properties.

Part C

In a further test, the product of Part A is mixed with a typical unsaturated type polyester, prepared from 1.2 moles of propylene glycol, 0–5 moles of maleic anhydride, and 0.5 mole of phthalic anhydride prepared by reaction at 395° F. for 4 hours in a normal manner. After cooling to 180° F., a quantity of the phosphorus pentoxide-allyl alcohol compound (product of Part A) is thoroughly blended in to provide a total phosphorus concentration of 2 percent by weight. After a conventional cure with peroxide catalysts, the polyester polymer is found to have excellent mechanical properties and will not burn after being subjected to a flame.

The same polyester, cured in the same manner, except that a diallyl phthalate monomer is substituted for the phosphorus monomer, also exhibits good mechanical properties but would burn after exposure to a flame and continue burning after removal from the flame.

EXAMPLE 13

Part A

Using the previously described techniques, a reaction product is made from 1 mole of phosphorus pentoxide, 2 moles of phenol, and 4 moles of propylene oxide. The reaction proceeds normally and the product after stripping is a clear liquid.

Results

| | |
|---|---|
| Viscosity, 68° F. centipoises | 1360 |
| Color | Clear yellow |
| Phosphorus content percent | 10.8 |
| Hydroxyl equivalent | 286 |
| Acid number | 0.42 |
| Free phenol | None |

Part B

To determine the effect of the product of Part A in metal working operations where extreme pressure is used, such as in a wire drawing operation, small amounts, of the order of 0.5% to 5% by weight, of the phosphorus-bearing compound of Part A are mixed with a water-soluable oil compound of the following composition:

| | Percent by Weight |
|---|---|
| Solvent refined 100 S.U.S. (paraffin oil) | 75 |
| Calcium Stearate | 10 |
| Potassium oleate | 10 |
| Diethylene glycol | 5 |

The base oil compound and the compounds containing various amounts of the phosphorus-containing material of Part A described above are tested for effectiveness as die lubricants in a magnet copper wire drawing operation. It is determined that amounts of the product of Part A as small as 2 percent by weight, based on the soluble oil, produce a measurable reduction in the wire draw tension and a pronounced freedom from galling, when a higher than normal reduction in diameter of the wire per die pass is attempted.

EXAMPLE 14

Using the same techniques as in the previous examples, a solution of resorcinol in propylene oxide is prepared and added to a slurry of phosphorus pentoxide in a low-boiling point hydrocarbon. Analysis of the reaction product shows that 1 mole of phosphorus pentoxide reacts with 2 moles of resorcinol and 4 moles of propylene oxide to form a new compound.

*Results*

| | |
|---|---|
| Viscosity 120° F. _____ centipoises__ | 15,500 |
| Color _____ | Amber clear |
| Phosphorus content _____ percent__ | 10.2 |
| Hydroxyl equivalent _____ | 150 |
| Acid number _____ | 0.72 |

From these results, it is concluded that a polyfunctional aromatic material reacts similarly to a monohydric phenol. Further, the existence of I.R. bands at 3300 cm.$^{-1}$ 1260 cm.$^{-1}$ and 1010 cm.$^{-1}$ indicate the presence of OH, P=O and —P—O—C— groups.

EXAMPLE 15

Part A

Using the same molar amounts and procedure as in Example 13, except that nonyl phenol of molecular weight 215, is substituted for phenol, a reaction is performed which proceeds normally.

*Results*

| | |
|---|---|
| Viscosity 68° F. _____ centipoises__ | 44,000 |
| Color _____ | Yellow Clear |
| Phosphorus content _____ percent__ | 7.5 |
| Hydroxyl equivalent _____ | 402.5 |
| Acid number _____ | 0.65 |

The existence of I.R. bands at 3290 cm.$^{-1}$, 1255 cm.$^{-1}$ and 1010 cm.$^{-1}$ indicates the presence of OH, P=O and —P—O—C— groups.

Part B

The product of Part A is tested for detergency and soil removal in a fabric dry cleaning solvent by the following method: Standard woolen, woven, fabric test patches, 2″ x 2″, are uniformly soiled with carbon black and used as soiled test swatches in a Launderometer experiment. For testing, a wide mouth screw-capped jar is loaded with several soiled swatches and one clear swatch, a number of small ball bearings and a measured quantity of dry cleaning solvent. The jar is vigorously agitated in the Launderometer at room temperature for thirty minutes and the swatches are then rinsed in fresh solvent and dried. Reflectance readings are then taken with a photovolt reflectometer which compares the unsoiled standard swatch with the cleaned originally soiled samples. Detergency is measured by numerically subtracting the initial reflectance value from the final reflectance value of the originally soiled swatch; the higher the resultant value, the more effective the detergent.

Greying is measured by subtracting the final reflectance value of the clean swatch from the initial reflectance value; the lower the number, the less greying. The standard solvent used is perchlorethylene, and test solution perchlorethylene to which has been added 1.5 percent by weight of the phosphorus-containing product of Part A.

| | Detergency | Greying |
|---|---|---|
| Perchlorethylene (standard)_____ | 8.5 | 25.6 |
| Perchlorethylene (plus 2% Product of Part A)_____ | 22.8 | 3.2 |

From such data, it can be deduced that the phosphorus compound of this example is a useful and highly effective additive for dry cleaning fluids.

EXAMPLE 16

Part A

A closed pressure reactor capable of operation at pressures above 5000 p.s.i., and equipped with an agitator, thermocouples, heating and cooling coils, and a pressure gage, is charged with 232 grams of propylene oxide and 182 grams of finely-divided sorbitol in suspension. The air in the reactor is displaced by a stream of nitrogen and the reactor is sealed. The temperature is raised to 130° C. at which time a pressure of 50 p.s.i. is observed on the gage. A suspension of 71 grams of phosphorus pentoxide in 200 grams of 1,3-propylene dichloride is prepared and injected slowly by means of a high pressure pump into the reactor vessel which is well agitated all the while. The pressure in the reactor is increased to 60 p.s.i.g., and the temperature reaches a peak of 145° C. when the pressure drops off to 50 p.s.i.g. The reactor is then cooled fast and the contents placed in a distillation apparatus where excess propylene oxide and other volatiles are stripped off. The product is then analyzed. The analysis indicates that the reaction conditions provide a product which essentially is produced from 1 mole of phosphorus pentoxide, 2 moles of sorbitol and 4 moles of propylene oxide.

*Results*

| | |
|---|---|
| Yield _____ percent__ | 92 |
| Viscosity _____ centipoises__ | 31,000 |
| Color _____ | Pale yellow |
| Phosphorus content _____ | 8.0 |
| Hydroxyl equivalent _____ | 90 |
| Acid number _____ | 0.8 |

The existence of I.R. bands at 3360 cm.$^{-1}$, 1260 cm.$^{-1}$ and 1010 cm.$^{-1}$ indicates the presence of OH, P=O, and —P—O—C— groups.

Part B

A similar experiment is carried out except that at 1000 p.s.i. the reactor is maintained for 30 minutes before cooling. Analysis shows that more propylene oxide is consumed. By such a procedure the hydroxy equivalent increases to 100 and the phosphorus content decreases to 6.5 percent.

EXAMPLE 17

Part A

The equipment and methods employed in Example 16 are used to react 1 mole of phosphorus pentoxide, 14 moles of propylene oxide and 2 moles of sucrose. A suspension of finely-powdered sucrose in 20 moles of propylene oxide is placed in the reactor, heated to 120° C. and the phosphorus pentoxide gradually injected. The pressure inside the vessel rises to a maximum of 1500 p.s.i.g. at 155° C. and then subsides to 500 p.s.i.g. The temperature is held at 140° C. for 40 minutes during which time the pressure drops. The temperature is then lowered to room temperature. The contents are vacuum stripped and analysis shows that 6 moles of propylene oxide are removed in the distillate.

*Results*

| | |
|---|---|
| Viscosity 140° F. _____ centipoises__ | 10,100 |
| Color _____ | Clear yellow |
| Phosphorus content _____ percent__ | 3.5 |
| Hydroxyl equivalent _____ | 108 |
| Acid number _____ | 0.85 |

The existence of I.R. bands at 3375 cm.$^{-1}$, 1255 cm.$^{-1}$ and 1040 cm.$^{-1}$ indicates the presence of OH, P=O, and —P—O—C— groups.

Part B.—Prepolymer preparation

The product of Part A is reacted according to customary procedures to form an isocyanate-terminated prepolymer. The proportions below were used:

| | Parts |
|---|---|
| Sucrose phosphorus polyol | 25.5 |
| 2,4-tolyene diisocyanate | 74.5 |
| | 100.0 |

The tolyene diisocyanate is charged into a reaction flask equipped with means for heating, cooling, and agitation, and a heated addition funnel, and provided with a nitrogen atmosphere.

The isocyanate is heated to 125° F. and the sucrose phosphorus polyol (Product of Part A) is heated to 150° F. and run in as a thin stream over a period of one hour. The exothermic reaction which results is controlled by cooling means and the temperature is held at 160° F. After the addition is completed, the clear liquid composition is heated to 175° F. for one hour under the nitrogen atmosphere and then allowed to cool. An assay of the resultant prepolymer shows that there is available 0.599 reactive isocyanate group per 100 grams of product. The product has a viscosity of 10,050 centipoises at 68° F.

Part C.—Preparation of rigid foam (1) A blend is made of the following:

| | Parts |
|---|---|
| (a) Prepolymer (Product of Part A) | 82.0 |
| (b) Freon 11 | 17.5 |
| (c) Silicone Surfactant (Carbide L-520) | 0.5 |
| | 100.0 |

(2) A fluid is made of the following:

| | Parts |
|---|---|
| (a) Sorbitol polyol (Product of Part A, Example 16) | 46 |
| (b) Tetramethyl butane diamine | 2 |
| | 48 |

Blend 2 is warmed to 100° F. to lower its viscosity and 48 parts are added to 100 parts of Blend 1 under intensive mixing conditions and poured into a container. A strong white foam rises in the container and is rigid and firm within 5 minutes from mixing. After a room temperature cure for 24 hours, the physical properties of the foam are examined and are as follows:

Results

| | |
|---|---|
| Compressive strength p.s.i. | 45 |
| Density, lbs. per cu. ft. | 2 |
| Tensile strength p.s.i. | 42 |
| Compressive yield percent | 12 |

A cut surface of the block of foam is subjected to a 2300° F. blow torch flame for 2 minutes. Upon removal of the torch flame, no flame persists in the foam, and no dripping occurs. The surface is covered with a laminated char to a depth of half an inch, and the foam underneath has the same strength as previously measured. A conventional rigid urethane foam continues burning and melts under similar conditions, and completely destroyed after exposure.

EXAMPLE 18

A resin kettle equipped with heating means, agitation, vacuum distillation means, reflux, inert gas sparge, and thermometers is charged with 3 moles of adipic acid, 1 mole of glycerol and 3 moles of 1,3-butylene glycol. In the customary manner for preparing alkyds, the temperature in the kettle is gradually raised to 200° C. and a blanket of dry nitrogen is introduced. After 4 hours at 200° C., the temperature is raised to 240° C. for 3 hours, after which the pressure in the kettle is reduced by means of a vacuum pump until a pressure of 2 mm. Hg is reached and held for a further 3 hours. The distillate removed is discarded. The product was a hydroxyl-terminated polyester with the following properties:

| | |
|---|---|
| Viscosity, 68° F. centipoises | 6500 |
| Color | Clear yellow |
| Water percent | 0.05 |
| Hydroxyl equivalent | 350 |
| Acid number | 1 |

The existence of I.R. bands at 3450 cm.$^{-1}$ indicates the presence of OH groups.

Part B

Into a reaction flask provided with agitation, thermometers, heating and cooling means, and an addition funnel is placed 500 grams of the polyester of Part A, and 350 grams of 1,2-butylene oxide. The contents of the flask are warmed to 30° C. A slurry of 38 grams of phosphorus pentoxide in 80 grams of cyclohexane is added slowly to the flask while the temperature is maintained by cooling to between 30° and 40° C. until the addition is completed; after 30 minutes, the distillate is removed through a receiver. A vacuum strip at 2 mm. Hg follows to remove any remaining voltailes. Analysis of the distillate shows that 300 grams of the 1,2-butylene oxide has been reacted.

Results

| | |
|---|---|
| Viscosity, 140° F. centipoises | 500 |
| Color | Clear yellow |
| Phosphorus content percent | 1.8 |
| Hydroxyl equivalent | 382 |
| Acid number | 0.91 |

Part C

A preparation is made by mixing the following:

| | Parts |
|---|---|
| Phosphorus-containing polyester (product of Part A) | 100 |
| 2,4-isomer tolyene diisocyanate | 23 |
| Triethylamine | 0.5 |

The liquid preparation is then spread on a glass plate as a thick film and allowed to cure. After four hours, the coating is examined and is found to be tack-free and hard. Upon stripping the clear film off the plate and subjecting it directly to a flame, it is found that the film neither melts nor burns and, after testing, has an excellent rating for abrasion and toughness.

EXAMPLE 19

Part A

A reaction flask fitted with heating, cooling and agitation means is charged with 900 grams of castor oil (hydroxyl equivalent of 343) and 200 grams of propylene oxide. Under good agitation and cooling conditions, 71 grams of phosphorus pentoxide is slowly added over a period of one hour by sifting through a dry box addition device. The flask temperature is maintained at 20° to 30° C. during the addition. The temperature is then riased and the volatiles are removed. Analysis shows that about 80 grams of propylene oxide comes off. From this, the proportions of reacting materials can be deduced as 2 moles of castor oil, 1 mole of $P_2O_5$, and 4 moles of propylene oxide.

Results

| | |
|---|---|
| Viscosity, 68° F. centipoises | 2500 |
| Color | Clear liquid |
| Phosphorus content percent | 2.8 |
| Hydroxyl equivalent | 368 |
| Acid number | 0.9 |

The existence of I.R. bands at 3425 cm.$^{-1}$, 1275 cm.$^{-1}$ and 1010 cm.$^{-1}$ indicates the presence of OH, P=O and —P—O—C— groups.

Part B

Tests are performed to determine the effect on corrosion of additions of the product of Part A to lubricating oils. One such test known to those skilled in the lubricating field is called the S.O.D. corrosion test, and, briefly described, determines the amount of measured wear under closely controlled conditions of specific types of bearing surfaces which are in frictional contact under the test oil for a specific period. The time in hours taken for 100 mg. loss from one of the bearings is plotted, and a value assigned to the lubricant. Following this procedure, an SAE 10, steam-distilled turbine oil is used as a base and tested as the standard; the summarized results are as follows:

| Lubricant: | Bearing weight loss, mg. |
|---|---|
| SAE 10 oil | 81 |
| SAE 10 oil plus 2% by weight of castor oil | 65 |
| SAE 10 oil plus 2% by weight of product of Part A | 5 |

From this, it can be seen that an appreciable improvement in lubrication is provided by the use of the phosphorus-containing product.

EXAMPLE 20

Part A

A three-necked, two-liter flask fitted with stirrer, cooling, heating, agitation and addition means, is charged with 913 grams of allyl glycidyl ether and 116 grams of allyl alcohol. The flask is cooled to 10° C. With good agitation there is added over a period of 30 minutes a suspension of 142 grams of phosphorus pentoxide in 500 grams of methylene chloride which is also cooled to 10° C. The reaction is exothermic but smooth and a clear solution is obtained. The contents of the flask is stripped of volatiles and subjected to a vacuum of 2 mm. Hg and 100° C. for 20 minutes.

Results

| | |
|---|---|
| Color | Water white |
| Viscosity, 68° F. centipoises | 800 |
| OH equivalent | 357 |
| Phosphorus content percent | 8.7 |
| Acid number | 0.4 |

Infrared spectra shows no epoxy groups are left, and strong adsorptions at 3075 cm.$^{-1}$ and 1645 cm.$^{-1}$ indicate that a large amount of double bond carbon groups is present. Further, I.R. bands at 3410 cm.$^{-1}$, 1280 cm.$^{-1}$ and 1010 cm.$^{-1}$ indicate the presence of OH, P=O and —P—O—C— groups.

Part B

A sample of the product can be made into a strong polymer by heating in an oven after adding in an organic peroxide catalyst. Clear copolymers can also be made by mixing with various unsaturated monomers such as methylmethacrylate monomer and polymerizing in the normal manner.

EXAMPLE 21

Part A

A product is prepared in the manner as in Example 1 except that phosphorus pentasulfide is used instead of phosphorus pentoxide. 22.2 grams of P$_2$S$_5$, 46.6 grams of propylene oxide and 14.8 grams of n-butanol are mixed in an Erlenmeyer flask. No exothermic reaction is observed and after one day, no visible reaction has taken place. After heating for one day at 80° C., all the solids have disappeared and the liquid is a clear solution. Volatiles are stripped off with heat and vacuum and analysis shows that the reaction product has been made from 1 mole of phosphorus pentasulfide, 2 moles of n-butanol and 4 moles of propylene oxide.

Results

| | |
|---|---|
| Color | Water white |
| Viscosity, 68° F. centipoises | 350 |
| Phosphorus content percent | 10 |
| Hydroxyl equivalent | 300 |
| Sulphur content percent | 26 |
| Acid number | 0.75 |

Infrared analysis shows that the reaction has proceeded to the same end point as in Example 1 and that the sulphur groups stay with the phosphorus as does the oxygen on the P$_2$O$_5$ molecule. Further, I.R. bands at 3400 cm.$^{-1}$, 800 cm.$^{-1}$ and 730 cm.$^{-1}$ indicate presence of OH, C—S and —P—S— groups, respectively.

Part B

A test of the product of Part A is made for potential use in a metal machining operation. To a metal cutting lathe equipped with power cutting feed and a carbide-tipped cutter bit is attached a circulating coolant system so that the cutting surface can be bathed continually with a coolant fluid.

A stainless steel type 309, 3″ diameter bar is centered in the lathe and a uniform speed of 180 surface feet per minute is set up for cutting tests. The coolant tank is filled with a 150 SUS paraffin base oil such as is normally used in making cutting oils and several cuts are made at a calibrated depth. The cuttings produced are short, curly and tough and the surface produced is irregular.

A further test is performed with the same oil base except that 5 percent by weight of the product of Part A is added to it. The feed and depth of cut are as before. The chips produced this time are long curls, are bright and show considerable springiness. The surface produced on the bar is very much improved over that obtained using the oil containing no product of Part A.

EXAMPLE 22

Part A

A phosphorus-containing amine is prepared by slowly adding 71 grams of P$_2$O$_5$ as a slurry in 300 grams of methylene chloride to a mixture of 146 grams of triethanolamine and 232 grams of propylene oxide. The exothermic reaction is controlled by cooling. After stripping off all volatiles, the product is analyzed.

Results

| | |
|---|---|
| Color | Water white |
| Viscosity, 68° F. centipoises | 2100 |
| Hydroxyl equivalent | 111 |
| Phosphorus content | 9.3 |
| Acid number | 0.5 |

Existence of I.R. bands at 3270 cm.$^{-1}$, 1210 cm.$^{-1}$ and 1055 cm.$^{-1}$ indicates the presence of OH, P=O and —P—O—C— groups.

Part B

A coating resin is prepared by dissolving and blending the following ingredients:

| | Percent by weight |
|---|---|
| Solution of 10% w./w. polyvinyl chloride-acetate (VYDR Union Carbide) in cyclohexanone | 90 |
| Product of Part A | 10 |
| | 100 |

The resulting clear solution is cast on a polished glass surface, allowed to dry and then stripped off. Examination of the film shows it to be clear, nonburning and flexible. A similar film cast without the phosphorus compound being added is somewhat brittle and exhibits considerably less elongation upon stretching.

EXAMPLE 23

Part A

There are combined, using previously described methods, by reacting under cooling conditions, 71 grams of $P_2O_5$, 72 grams of n-butanol, and 280 grams of 1-epoxyethyl-3,4-epoxycyclohexane (vinyl cyclohexene dioxide) which is present in excess during the reaction. The excess is stripped off after the exotherm subsides.

Results

| | |
|---|---|
| Color | Water white |
| Viscosity, 68° F. centipoises | 212 |
| Hydroxyl equivalent | 440 |
| Epoxy equivalent | 220 |
| Phosphorus content percent | 7 |
| Acid number | 0.4 |

Infrared spectra show that the 3,4-epoxycyclohexane group which is directly attached to the ring has reacted and is not detectable. The bands identified with the 1-epoxy ethyl group are still present and available for further reaction. Further I.R. bands at 3425 cm.$^{-1}$, 1280 cm.$^{-1}$ and 1010 cm.$^{-1}$ indicate the presence of OH, P=O and —P—O—C— groups.

Part B

A solution of 15 percent w./w. of Parlon S-125 chlorinated rubber (Hercules Powder Company) in methylene chloride is prepared; to this added 10 percent w./w. of the product of Part A. Test films of the resulting mixture are cast on various substrates and exposed to ultraviolet light via a Weatherometer for twenty-four hours. Upon examination, it is found that the films are intact and flexible and have not appreciably darkened. Test films exposed simultaneously on similar substrates, but made from the same Parlon solution without the addition of the phosphorus compound of Part A, upon examination are shown to be badly flaked, very dark in color and extremely brittle.

EXAMPLE 24

Into a 1-liter flask equipped with a thermometer, agitation means, addition funnel, reflux condenser, and a Dry Ice-acetone bath, is placed 156 grams of propylene oxide and 138 grams of 2 mercapto ethanol,

which are blended and cooled in the flask to —20° C.

Phosphorus pentoxide (116 grams) is suspended in 200 grams of methylene chloride and cooled to —10° C. before adding to the contents of the flask in small increments, so that the temperature of the contents does not rise above —5° C. After the addition is complete, agitation is continued and the cooling means removed, so that a gradual rise to room temperature occurs over a period of one hour.

The volatiles are then distilled off, and a vacuum strip of 2 mm. at 100° C. applied to the flask contents. Analysis of the distillate and calculation of the weight of the flask contents show that the ratio of reactants are: propylene oxide—4 moles; 2 mercapto ethanol—1 mole, and phosphorus pentoxide—1 mole. Analysis of the product shows the following:

Results

| | |
|---|---|
| Viscosity centipoises | 1800 |
| Color | Water white liquid |
| Hydroxyl equivalent grams | 325 |
| Phosphorus content percent | 9.5 |
| Sulfur content do | 9.0 |
| Acid number | 0.5 |

The existence of I.R. bands at 3375 cm.$^{-1}$, 2550 cm.$^{-1}$, 1150 cm.$^{-1}$, and 1010 cm.$^{-1}$ indicates the presence of OH, —SH, P=O and —P—O—C— groups. The unmistakable band at 2550 cm.$^{-1}$ for —SH also shows that only the OH group of the 2-mercapto ethanol takes part in the reaction, leaving the —SH groups as reactive terminations on the molecule.

As the foregoing description and examples indicate, compositions of this invention are useful and advantageous as agricultural chemical adjuvants, detergent components, lubricant and cooling fluid additives, polyurethane components, both fire-retardant foams and elastomers, plasticizers, corrosion inhibitors, hydraulic fluids, and the like.

It is to be understood that although the invention has been described with specific reference to particular embodiments thereof it is not to be so limited as changes and alterations therein may be made which are within the full intended scope of this invention as defined by the appended claims.

What is claimed is:

1. Hydrolysis resistant, phosphorous containing composition having an acid number not higher than 1 which has been produced by the reaction together at temperatures less than about 120° C. of
   (a) a member selected from the group consisting of dry phosphorous oxides and sulfides:
   (b) as an oxyalkylating agent a compound containing at least one reactive oxirane group; and
   (c) a compound having at least one active hydrogen from an attached group selected from hydroxyl and thiol, the reaction products of (a), (b) and (c) being present in the composition in the molar ratio of $a:b:c$ of 1:3.5 to 20:up to 2 with the proviso that (a), (b) and (c) are mixed together prior to reaction between any of the reactants.

2. The composition of claim 1 in which the acid number is not higher than 1 and wherein reactant (a) is phosphorous sulfide.

3. The composition of claim 1 wherein reactant (a) is phosphorous oxide.

4. Composition claimed in claim 3 wherein (b) is alkylene oxide.

5. Composition claimed in claim 4 wherein (c) contains a hydroxyl group.

6. Composition claimed in claim 5 wherein (a) is a phosphorous pentoxide.

7. Composition claimed in claim 5 wherein (c) is an alkanol.

8. Composition claimed in claim 6 wherein (c) is a polyol.

9. Process for the preparation of hydrolysis resistant, phosphorous containing compositions having an acid number not higher than 1 comprising mixing together prior to reaction between any two of the reactants;
   (a) a member selected from the group consisting of dry phosphorous oxides and sulfides;
   (b) from 3.5 to 20 moles per mole of (a) of as an oxyalkylating agent a compound containing at least one reactive oxirane group; and
   (c) up to 2 moles per mole of (a) of a compound having at least one active hydrogen from a member selected from the group consisting of hydroxyl and thiol, maintaining the mixture at a reaction temperature less than 120° C. and for a time sufficient to produce a product containing chemically combined the reactants in the ratio of 1 mole of (a) from 3.5 to 20 moles of (b) and 2 moles of (c).

10. Process claimed in claim 9 wherein finely divided phosphorous pentoxide (a) is mixed with (b) and (c) initially at a temperature between —40° and 0° C. and in an inert liquid organic solvent.

References Cited

UNITED STATES PATENTS

| | | | |
|---|---|---|---|
| 2,568,784 | 9/1951 | Woodstock | 260—980 |
| 2,842,462 | 7/1958 | Haas et al. | 260—978 X |

(Other references on following page)

UNITED STATES PATENTS

| | | | |
|---|---|---|---|
| 3,010,988 | 11/1961 | Raffetson et al. | 260—461 |
| 3,072,703 | 1/1963 | Turbak | 260—461 |
| 3,085,929 | 4/1963 | Haslam | 167—22 |
| 3,093,592 | 6/1963 | Porcars | 252—163 |
| 3,099,626 | 7/1963 | Riede | 252—163 |
| 3,148,961 | 9/1964 | Dykstra | 44—76 |
| 3,156,659 | 11/1964 | Robitschek | 260—2.5 |
| 3,158,534 | 11/1964 | Frohberger et al. | 167—22 |
| 3,162,616 | 12/1964 | Dombrow et al. | 260—75 |
| 3,163,506 | 12/1964 | Steinberg et al. | 44—76 |
| 3,164,569 | 5/1965 | Ide et al. | 260—75 |
| 3,184,420 | 5/1965 | Brack | 260—2.5 |

CHARLES B. PARKER, *Primary Examiner.*

LEON J. BERCOVITZ, *Examiner.*

F. McKELVEY, F. M. SIKORA, A. H. SUTTO,
*Assistant Examiners.*